United States Patent
Keefer et al.

(10) Patent No.: US 9,394,171 B2
(45) Date of Patent: Jul. 19, 2016

(54) METHOD AND SYSTEM FOR BIOMASS HYDROGASIFICATION

(75) Inventors: Bowie G. Keefer, Galiano Island (CA); Matthew L. Babicki, West Vancouver (CA); Brian G. Sellars, Coquitlam (CA); Edson Ng, North Vancouver (CA)

(73) Assignee: G4 Insights Inc., Burnaby, British Columbia (CA)

( * ) Notice: Subject to any disclaimer, the term of this patent is extended or adjusted under 35 U.S.C. 154(b) by 1071 days.

(21) Appl. No.: 13/474,453

(22) Filed: May 17, 2012

(65) Prior Publication Data

US 2013/0023707 A1 Jan. 24, 2013

Related U.S. Application Data

(63) Continuation of application No. PCT/CA2010/001833, filed on Nov. 18, 2010.

(60) Provisional application No. 61/262,481, filed on Nov. 18, 2009.

(51) Int. Cl.
*C10B 57/04* (2006.01)
*C01B 3/38* (2006.01)
(Continued)

(52) U.S. Cl.
CPC . *C01B 3/38* (2013.01); *B01J 38/22* (2013.01); *C10B 49/22* (2013.01); *C10B 53/02* (2013.01); *C10G 2/32* (2013.01); *C10K 1/026* (2013.01); *C10K 1/32* (2013.01); *C10K 3/04* (2013.01); *C10L 3/08* (2013.01); *C10L 3/104* (2013.01); *C01B 2203/0233* (2013.01);
(Continued)

(58) Field of Classification Search
CPC ............ C10K 3/02; C10B 3/56; C10B 49/22; C10B 47/24; C10G 2300/1011
USPC ............................... 585/240; 202/96; 422/139
See application file for complete search history.

(56) References Cited

U.S. PATENT DOCUMENTS 3,070,703 A 12/1962 Podolny
3,336,162 A 8/1967 Zachmann
(Continued)

FOREIGN PATENT DOCUMENTS

CA 1256038 6/1989
CA 2016045 8/1994
(Continued)

OTHER PUBLICATIONS

Peacocke et al. Notes on Terminology and Technology, Thermal Conversion, International Biochar Initiative, 2005.*
(Continued)

*Primary Examiner* — Nina Bhat
(74) *Attorney, Agent, or Firm* — Klarquist Sparkman, LLP

(57) ABSTRACT

Certain aspects of the system and method concern producing hydrocarbons from biomass. The method is particularly useful for producing substitute natural gas from forestry residues. A biomass feedstock may be converted into a product hydrocarbon by fast pyrolysis. The resulting pyrolysis gas is converted to the product hydrocarbon and carbon dioxide in the presence of hydrogen and steam while simultaneously generating the required hydrogen by reaction with steam under prescribed conditions for self-sufficiency of hydrogen. Methane is a preferred hydrocarbon product. A system also is described for cycling the catalyst between steam reforming, methanation and regeneration zones.

24 Claims, 5 Drawing Sheets

(51) Int. Cl.
*C10L 3/08* (2006.01)
*C10L 3/10* (2006.01)
*B01J 38/22* (2006.01)
*C10K 1/02* (2006.01)
*C10K 1/32* (2006.01)
*C10K 3/04* (2006.01)
*C10B 49/22* (2006.01)
*C10B 53/02* (2006.01)
*C10G 2/00* (2006.01)

(52) U.S. Cl.
CPC .... *C01B 2203/062* (2013.01); *C10G 2300/708* (2013.01); *Y02E 20/16* (2013.01); *Y02E 50/14* (2013.01); *Y02E 50/32* (2013.01); *Y02P 20/145* (2015.11); *Y02P 20/584* (2015.11)

(56) References Cited

U.S. PATENT DOCUMENTS

| | | | |
|---|---|---|---|
| 3,625,664 A * | 12/1971 | Padovani | C10K 3/02 48/197 R |
| 3,748,180 A | 7/1973 | Clausi et al. | |
| 3,847,672 A | 11/1974 | Trocciola et al. | |
| 3,865,924 A | 2/1975 | Gidaspow et al. | |
| 3,975,913 A | 8/1976 | Erickson | |
| 4,135,361 A | 1/1979 | Eisenhaure | |
| 4,386,309 A | 5/1983 | Peschka | |
| 4,532,192 A | 7/1985 | Baker et al. | |
| 4,555,453 A | 11/1985 | Appleby | |
| 4,595,642 A | 6/1986 | Nakanishi et al. | |
| 4,759,997 A | 7/1988 | Ohyauchi et al. | |
| 4,781,735 A | 11/1988 | Tagawa et al. | |
| 4,801,308 A | 1/1989 | Keefer | |
| 4,816,121 A | 3/1989 | Keefer | |
| 4,822,935 A | 4/1989 | Scott | |
| 4,968,329 A | 11/1990 | Keefer | |
| 4,969,935 A | 11/1990 | Hay | |
| 4,988,580 A | 1/1991 | Ohsaki et al. | |
| 5,068,159 A | 11/1991 | Kinoshita | |
| 5,079,103 A | 1/1992 | Schramm | |
| 5,147,735 A | 9/1992 | Ippommatsu et al. | |
| 5,175,061 A | 12/1992 | Hildebrandt et al. | |
| 5,256,172 A | 10/1993 | Keefer | |
| 5,292,598 A | 3/1994 | Rosner | |
| 5,328,503 A | 7/1994 | Kumar | |
| 5,366,818 A | 11/1994 | Wilkinson et al. | |
| 5,408,832 A | 4/1995 | Boffito et al. | |
| 5,411,578 A | 5/1995 | Watson | |
| 5,434,016 A | 7/1995 | Benz et al. | |
| 5,504,259 A * | 4/1996 | Diebold | C10B 49/12 568/697 |
| 5,523,176 A | 6/1996 | Fonda-Bonardi | |
| 5,523,326 A | 6/1996 | Dandekar et al. | |
| 5,543,238 A | 8/1996 | Strasser | |
| 5,593,640 A | 1/1997 | Long et al. | |
| 5,604,047 A | 2/1997 | Bellows et al. | |
| 5,645,950 A | 7/1997 | Benz et al. | |
| 5,686,196 A | 11/1997 | Singh et al. | |
| 5,711,926 A | 1/1998 | Knaebel | |
| 5,714,276 A | 2/1998 | Okamoto | |
| 5,811,201 A | 9/1998 | Skowronski | |
| 5,832,728 A | 11/1998 | Buck | |
| 5,867,978 A | 2/1999 | Klanchar et al. | |
| 5,900,329 A | 5/1999 | Reiter et al. | |
| 5,917,136 A | 6/1999 | Gaffney et al. | |
| 5,980,857 A | 11/1999 | Kapoor et al. | |
| 5,981,096 A | 11/1999 | Hornburg et al. | |
| 6,045,933 A | 4/2000 | Okamoto | |
| 6,051,050 A | 4/2000 | Keefer et al. | |
| 6,110,612 A | 8/2000 | Walsh | |
| 6,170,264 B1 | 1/2001 | Viteri et al. | |
| 6,176,897 B1 | 1/2001 | Keefer | |
| 6,190,623 B1 | 2/2001 | Sanger et al. | |
| 6,190,791 B1 | 2/2001 | Hornburg | |
| 6,194,092 B1 | 2/2001 | Ohara et al. | |
| 6,206,630 B1 | 3/2001 | Feltenberger et al. | |
| 6,283,723 B1 | 9/2001 | Milburn et al. | |
| 6,293,767 B1 | 9/2001 | Bass | |
| 6,305,442 B1 | 10/2001 | Ovshinsky et al. | |
| 6,312,843 B1 | 11/2001 | Kimbara et al. | |
| 6,627,338 B2 | 9/2003 | St-Pierre et al. | |
| 6,854,273 B1 | 2/2005 | Lasley et al. | |
| 6,863,878 B2 | 3/2005 | Klepper | |
| 7,553,568 B2 | 6/2009 | Keefer et al. | |
| 7,868,214 B2 | 1/2011 | Marker | |
| 7,872,054 B2 | 1/2011 | Cortright et al. | |
| 7,905,990 B2 * | 3/2011 | Freel | C10B 49/22 201/12 |
| 7,960,598 B2 | 6/2011 | Spilker et al. | |
| 8,015,808 B2 | 9/2011 | Keefer et al. | |
| 8,063,258 B2 | 11/2011 | Bartek et al. | |
| 8,147,766 B2 | 4/2012 | Spilker et al. | |
| 8,383,871 B1 * | 2/2013 | Sellars | C10L 3/08 208/67 |
| 8,541,637 B2 * | 9/2013 | Babicki | C01B 3/56 201/25 |
| 8,961,743 B2 * | 2/2015 | Freel | C10B 49/22 202/108 |
| 2002/0142198 A1 | 10/2002 | Towler et al. | |
| 2002/0142208 A1 | 10/2002 | Keefer et al. | |
| 2005/0006281 A1 | 1/2005 | Boger et al. | |
| 2007/0170091 A1 | 7/2007 | Monnier et al. | |
| 2007/0225383 A1 * | 9/2007 | Cortright | C01B 3/326 518/702 |
| 2007/0272538 A1 | 11/2007 | Satchell | |
| 2009/0165378 A1 * | 7/2009 | Agblevor | C10B 47/24 48/127.7 |
| 2009/0217584 A1 * | 9/2009 | Raman | C10J 3/00 48/127.7 |
| 2009/0263317 A1 | 10/2009 | Chen | |
| 2010/0043278 A1 | 2/2010 | Brevoord et al. | |
| 2010/0140136 A1 * | 6/2010 | Spilker | C01B 3/32 208/57 |
| 2010/0228062 A1 | 9/2010 | Babicki et al. | |
| 2010/0251615 A1 * | 10/2010 | Marker | C01B 3/16 48/127.7 |

FOREIGN PATENT DOCUMENTS

| | | |
|---|---|---|
| CA | 2109055 | 2/1999 |
| CA | 2087972 | 1/2000 |
| CA | 2087973 | 1/2001 |
| CA | 2475015 | 8/2003 |
| CA | 2476409 | 9/2003 |
| CA | 2718295 | 10/2009 |
| DE | 3913581 | 10/1990 |
| EP | 0 341 189 | 11/1989 |
| EP | 0 143 537 | 3/1990 |
| EP | 0 681 860 | 11/1995 |
| EP | 0 691 701 | 1/1996 |
| EP | 1 070 531 | 1/2001 |
| JP | 62278770 | 3/1987 |
| JP | 06-208853 | 7/1994 |
| JP | 07094200 | 4/1995 |
| JP | 07-279758 | 10/1995 |
| JP | 8045526 | 2/1996 |
| JP | 11214021 | 8/1999 |
| JP | 2000-072401 | 3/2000 |
| WO | WO 95/28510 | 10/1995 |
| WO | WO 99/46032 | 9/1999 |
| WO | WO 00/21911 | 4/2000 |
| WO | WO 00/75559 | 12/2000 |
| WO | WO 00/76628 | 12/2000 |
| WO | WO 00/76630 | 12/2000 |
| WO | WO 01/00987 | 1/2001 |
| WO | WO 02/35623 | 5/2002 |
| WO | WO 02/102943 | 12/2002 |
| WO | WO 2004/030130 | 4/2004 |
| WO | WO 2007/041293 | 12/2007 |
| WO | WO 2008/033812 | 3/2008 |

(56) References Cited

FOREIGN PATENT DOCUMENTS

| WO | WO 2009/007061 | 1/2009 |
|---|---|---|
| WO | WO 2009/124017 | 10/2009 |
| WO | WO 2010/099626 | 9/2010 |

OTHER PUBLICATIONS

Bridgwater, Peacocke "Fast Pyrolysis for Biomass", Renewable & Sustainable Energy Reviews, Elsevier, 2000.*

Carson et al., "Thermodynamics of Pressure Swing Adsorption (PSA) in the Recovery of Residual Hydrogen from SOFC Anode Gas," *Proceedings of the Intersociety Energy Conversion Engineering Conference* Conf.30:229-234, Jan. 1, 1995.

Chatsiriwech et al., "Enhancement of Catalytic Reaction by Pressure Swing Adsoprtion," *Catalysis Today* 20:351-366, 1994.

Fyke et al., "Recovery of Thermomechanical Exergy From Cryofuels," *Int. J. Hydrogen Energy* 22(4):435-440, 1997.

Hufton et al., "Sorption Enhanced Reaction Process for Hydrogen Production," *AIChE Journal* 45(2):248-256, 1999.

Oshima et al., "The utilization of $LH_2$ and LNG cold for generation of electric power by a cryogenic type Stirling Engine," *Cryogenics* 617-620, Nov. 1978.

Vaporciyan et al., "Periodic Separating Reactors: Experiments and Theory," *AIChE Journal* 35:831-844, 1989.

Extended European Search Report dated Apr. 24, 2013, from European Patent Application No. 10830995.6.

International Search Report dated May 21, 2010, from International Application No. PCT/CA2010/000328.

International Search Report dated Feb. 7, 2011, from International Application No. PCT/CA2010/001833.

International Search Report dated Feb. 8, 2011, from International Application No. PCT/CA2010/001859.

Huber et al., "Synthesis of transportation fuels from biomass: Chemistry, catalysts, and engineering," *Chemical Reviews, American Chemical Society* 106(9):4044-4098, 2006.

Extended European Search Report dated Jun. 20, 2013, from European Patent Application No. 10748278.8.

Morsi, "Twenty-Fifth Annual International Pittsburgh Coal Conference, Coal—Energy, Environment and Sustainable Development, Abstracts Booklet," pp. 1-61, University of Pittsburgh, Swanson School of Engineering, Pittsburgh, PA, Sep. 29 through Oct. 2, 2008.

* cited by examiner

METHOD AND SYSTEM FOR BIOMASS HYDROGASIFICATION

CROSS REFERENCE TO RELATED APPLICATION

This is a continuation under 35 U.S.C. §120 of International Patent Application No. PCT/CA2010/001833, filed Nov. 18, 2010, which claims the benefit of the earlier filing date of U.S. Provisional Application No. 61/262,481, filed Nov. 18, 2009. Each of these prior applications is incorporated herein by reference.

FIELD

The method of the invention applies to hydropyrolysis or hydrogasification of carbonaceous feedstocks, particularly of biomass, and more particularly of forestry residues, to generate higher value synthetic fuels, in particular methane.

BACKGROUND

Thermochemical conversion of biomass such as sawmill wood wastes, forestry residues and agricultural wastes into synthetic fuels is an important emerging avenue for advancement of renewable energy sources to supplement or replace fossils fuels. While air blown gasification is used for generation of lower heating value fuel gas, several variants of oxygen or steam gasification can be used for production of syngas containing minimal nitrogen. Syngas is a gas mixture containing mostly hydrogen and carbon monoxide, and is a versatile feedstock for further chemical processing into a wide range of useful fuels and chemical compounds. Syngas can be catalytically converted into methane, Fischer-Tropsch liquid fuels, methanol, dimethyl ether, or hydrogen. The methanation reaction of syngas to generate methane and byproduct water vapour is typically conducted over nickel catalysts at temperatures in the range of about 300° C. to about 400° C., and preferably at elevated pressure.

Methane is readily marketed and delivered through existing natural gas distribution infrastructure as substitute natural gas (SNG) for numerous end uses including space heating and electrical power generation. Methane has considerably higher energy density than hydrogen, and can be converted into syngas or hydrogen by catalytic steam reforming. Modern combined cycle power plants are conveniently fueled by natural gas. Methane is also a particularly advantageous fuel for future high temperature fuel cell power plants using highly endothermic internal steam reforming of natural gas to recover high grade heat generated by the fuel cell stack.

The reaction of steam with biomass to generate syngas is highly endothermic, hence must be conducted with direct or indirect heating by partial oxidation with air or oxygen. This reaction is typically conducted at much higher temperature than the subsequent exothermic methanation reaction. The temperature mismatch between higher temperature gasification and much lower temperature methanation reactions is detrimental to method efficiency.

An oxygen blown entrained flow gasifier may typically operate at about 1300° C. to 1500° C., at which temperatures methane and higher hydrocarbons are all nearly entirely converted to syngas. This has the important advantage of almost completely eliminating tar constituents, but the disadvantage for SNG production that all of the product methane must be generated by the exothermic methanation of syngas at much lower temperature than the gasification temperature. The heat of methanation is thus released at much lower temperature than gasifier temperatures, resulting in some loss of thermal efficiency.

Indirect steam gasifiers (such as the US Battelle/Ferco system, the Austrian fast internally circulating fluidized bed (FICFB) system, and the Dutch "Milena" system) operate at about 850° C. These systems use twin bed configurations, in which fluidized granular heat transfer media is circulated between a gasification zone in which steam reacts with the biomass to produce syngas and char, and a regeneration zone in which the char is combusted to reheat the media. The product syngas contains a significant admixture of methane generated within the gasifier. While downstream processing is required to convert or remove tar constituents, an important advantage for SNG production is that only about 55% to 60% of the final product methane must be generated by downstream methanation of syngas, since a useful fraction of the methane was already produced with the syngas.

Hydrogasification has previously been investigated for gasification of biomass. The key reaction is hydrogenation of carbon or carbon oxides to form methane, whose exothermicity is a great advantage compared to other gasification approaches. As hydrogen is a premium fuel, its consumption in large amounts has presented the appearance of a major economic barrier.

The endothermic nature of the syngas formation reaction from the reaction of biomass pyrolysis gas and steam requires enthalpy heat to be added (typically by partial combustion with added oxygen). Temperatures well in excess of 650° C. are typically required to reduce tars to reasonable levels.

The gas composition produced in biomass gasification approaches a complex equilibrium established between CO, $CO_2$, $H_2$, $H_2O$ and $CH_4$ which is a function of temperature, pressure and overall gas composition. Reforming reactions producing syngas increasingly dominate the equilibrium at temperatures above 650° C. at the expense of hydrocarbons, $CO_2$ and water.

The use of catalysts, such as the use of olivine, dolomite or nickel coated media in fluidized beds, to enhance the rate of syngas formation is well known. These catalysts allow a faster reaction towards syngas equilibrium favoured under the method conditions. Catalysts have also been used in a secondary bed in series with the gasifier for the reduction of tars contained in the syngas or producer gas.

There is a need to provide more efficient internally self-sustaining generation of the hydrogen needed for hydrogasification, which otherwise is an extremely attractive approach for conversion of biomass and other carbonaceous feedstocks into methane and other high value synthetic fuels.

SUMMARY

Embodiments of the present method concern converting a biomass feedstock into a product hydrocarbon by:
a. subjecting the feedstock to fast pyrolysis with rapid pyrolytic heating in the substantial absence of oxygen in order to generate fractions of pyrolysis gas and char;
b. catalytically converting at least a portion of the pyrolysis gas to the product hydrocarbon and carbon dioxide in the presence of hydrogen and steam;
c. generating at least a portion of the hydrogen by reaction between steam and a portion of the pyrolysis gas or the hydrocarbon;
d. separating the carbon dioxide; and
e. separating recycle hydrogen from the hydrocarbon product.

The fast pyrolysis step may be performed with externally heated heat transfer media, e.g. circulating through a pressurized auger reactor, and preferably as hydropyrolysis in a hydrogen atmosphere. The heat transfer media may include circulating magnetite pellets which are readily separable from char according to density and magnetic properties. Some impurities such as alkalis, other metals, sulphur, and chloride will be partially entrained by the char. While very fast pyrolysis will minimize char production, slower pyrolysis may also be considered for coproduction of charcoal or biochar with lower yield of methane and any other desirable hydrocarbon products.

Other disclosed embodiments provide a cyclic catalytic method for converting a biomass feedstock into a product hydrocarbon, in which a catalyst is exposed to a range of temperatures between a higher temperature and a lower temperature, and the catalyst is cyclically subjected to the following sequential steps:

a. an endothermic steam reforming step starting from a higher temperature and ending at a lower temperature;
b. an exothermic methanation step starting from about the lower temperature; and
c. an oxidative regeneration step ending at about the higher temperature.

The higher temperature may be in the range of from about 600° C. to about 900° C., while the lower temperature may be in the range of from about 400° C. to about 600° C.

The catalytic conversion step includes catalytic hydrogasification, such as steam hydrogasification. Hydroconversion, hydrodeoxygenation, and hydrocracking reactions will take place. The net reaction will be exothermic. This step may be conducted in any suitable reactor configuration, including without limitation, the following reactor configurations, so that the catalyst will cycle between reaction zones for the steam reforming, methanation and oxidative regeneration steps:

a) moving bed with granular catalyst;
b) fixed bed with granular packing or monolithic catalyst, and rotary or directional valve logic for cyclically switching beds between reaction and regeneration steps;
c) bubbling or circulating fluidized bed.

Hydrogasification requires a source of hydrogen, either externally supplied or internally generated. One aspect of the disclosed embodiments is that steam addition, plus moisture contained in feed biomass, provides sufficient steam for internal self-sustaining generation of hydrogen required for the hydrogasification reaction converting biomass feedstock into methane.

Disclosed embodiments of the present method may be realized by any of the following operating modes:

1. Self-sustaining recycle of $H_2$ generated within catalytic stage with sufficient $H_2$ excess to overcome incomplete recovery in downstream gas separation of recycle $H_2$. Methane yield is approximately 50% of carbon after char production, balance primarily to $CO_2$ with preferred use of water gas shift reaction to consume most CO.
2. Supplemental hydrogen may provided from any combination of (a) an external source of hydrogen rich gas, or (b) oxygen or steam gasification of char and/or offgas from the process, or (c) steam methane reforming of a portion of the methane product. Supplemental hydrogen may alternatively be provided as electrolytic hydrogen preferably generated by a renewable energy source such as wind energy, together with electrolytic oxygen which may be used for combustion of char generated in the process to produce concentrated $CO_2$, or for oxygen gasification of the char so as produce syngas and further supplemental hydrogen.
3. One preferred embodiment includes methanation, regeneration and reforming steps. Higher temperature, high steam concentration and low hydrogen concentration drive the reforming reaction forward. Lower temperature, low steam concentration and high hydrogen concentration drive the methanation reaction forward. Reforming and methanation may take place in each of the reforming and methanation steps, with the equilibrium balance reflecting not only bed temperature but also the steam/hydrogen ratio over the catalyst. The catalyst beds are cooled by reforming, heated by methanation and strongly heated to the maximum method temperature by regeneration. The reforming step follows the regeneration step to take advantage of sensible heat in the bed, then the methanation step follows after the catalyst bed has been cooled by the reforming step, and then the next regeneration step takes place to finish reheating the bed up to its cyclic maximum temperature. Such embodiments are an inventive extension of the known principle of cyclic reforming, in which sensible heat for repeated reforming steps is provided by alternatingly repeated regeneration steps, with the present inventive method also including methanation steps following reforming steps and preceding regeneration steps.
4. High methane yield in hydrogasification, however up to half of that methane may be consumed downstream to generate recycle hydrogen and $CO_2$.

With larger steam supply, higher temperature and/or lower operating pressure, the method may generate excess syngas or hydrogen so that coproduction of methane and hydrogen/syngas may be contemplated. Coproduction of methane and higher hydrocarbon fuel commodities is also attractive.

Certain disclosed embodiments also include cleaning steps to remove catalyst poisons (alkalis, other metals, phosphorus, sulfur, chloride, etc.) and tars. Hot or cold clean-up alternatives may be used. Hot clean-up steps include sorbents (e.g. ZnO to remove sulphur), and catalytic tar cracking followed by cool-down in cyclic thermal regenerator loaded with layers of fine filtration metal matrix, porous ceramic, catalyst and adsorbent. Regeneration can be achieved by burning off tar and coke deposits, then air flush to cool the filtration matrix and provide hot air for front end feed dryer. Cold clean-up can be achieved by higher temperature oil quench and wash, followed by lower temperature water quench and wash.

Disclosed embodiments include gas separation steps for removing $CO_2$, for recovering a hydrogen-enriched recycle stream for the hydrogasification step, and for purifying the product methane. Preferred gas separation alternatives include carbonation of CaO or pressure swing adsorption (PSA) for $CO_2$ removal, and PSA or polymeric membranes for separation of $H_2$ from $CH_4$.

The foregoing and other objects, features, and advantages of the invention will become more apparent from the following detailed description, which proceeds with reference to the accompanying figures.

DETAILED DESCRIPTION

Figure 1:
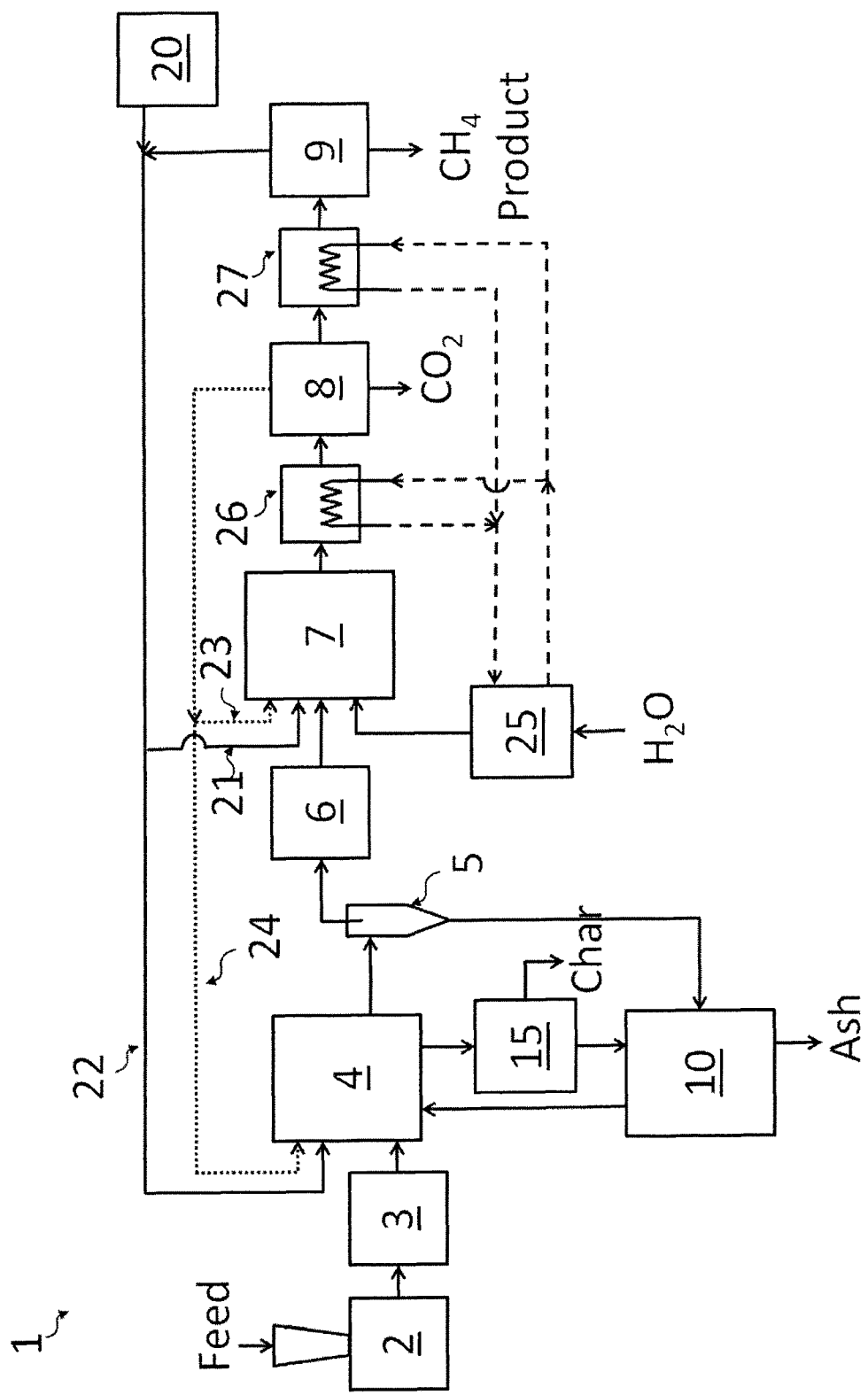
FIG. 1 is a schematic diagram of one embodiment of a system according to the invention.

FIG. 1 shows a simplified schematic of a system 1 according to the invention. System 1 includes a feed preparation section 2, a feed pressurization section 3, a pyrolysis reactor 4, a solids separation section 5, a catalyst poison removal section 6, a catalytic hydrogasification reactor 7, a carbon dioxide removal section 8 and a methane upgrading section 9.

Feed preparation section 2 includes steps of sizing and drying as necessary. Feed pressurization section 3 includes a lock hopper system or a pressure feeder device to introduce the feed biomass into the pyrolysis and gasification method at a working pressure of preferably about 5 bara to about 100 bara, and more preferably about 10 bara to about 20 bara.

Pyrolysis reactor 4 provides rapid heating of the biomass particles to a pyrolysis temperature in the range from about 300° C. to about 500° C., in order to decompose the biomass into pyrolysis gas (including light hydrocarbons, some syngas, and tar vapours) and char. Heating may be achieved by mixing the biomass particles with a granular heat transfer media in a mechanical or fluidized bed contacting system. Various mechanisms are well known for fast pyrolysis reactors (e.g. auger reactors and circulating fluidized beds), and may be used in a mechanical contacting system in reactor 4. The granular heat transfer media should have high heat capacity, thermal conductivity and attrition resistance. Olivine sand is recognized as having excellent properties as heat transfer media in biomass gasification, including moderate catalytic properties for reforming tar constituents. Magnetite may also be useful as heat transfer media, with the potential advantage of downstream magnetic separation between the heat transfer media and char.

The heat exchange media is circulated between reactor 4 and a media heater 10, with pyrolytic char being discharged from reactor 4 with spent heat exchange media returning to the media heater 10. Combustion of char in media heater 10 may conveniently provide heat required for heating the feed biomass to reaction temperature and for the endothermic pyrolysis and initial gasification reactions. Ash is discharged from media heater 10.

Figure 2:
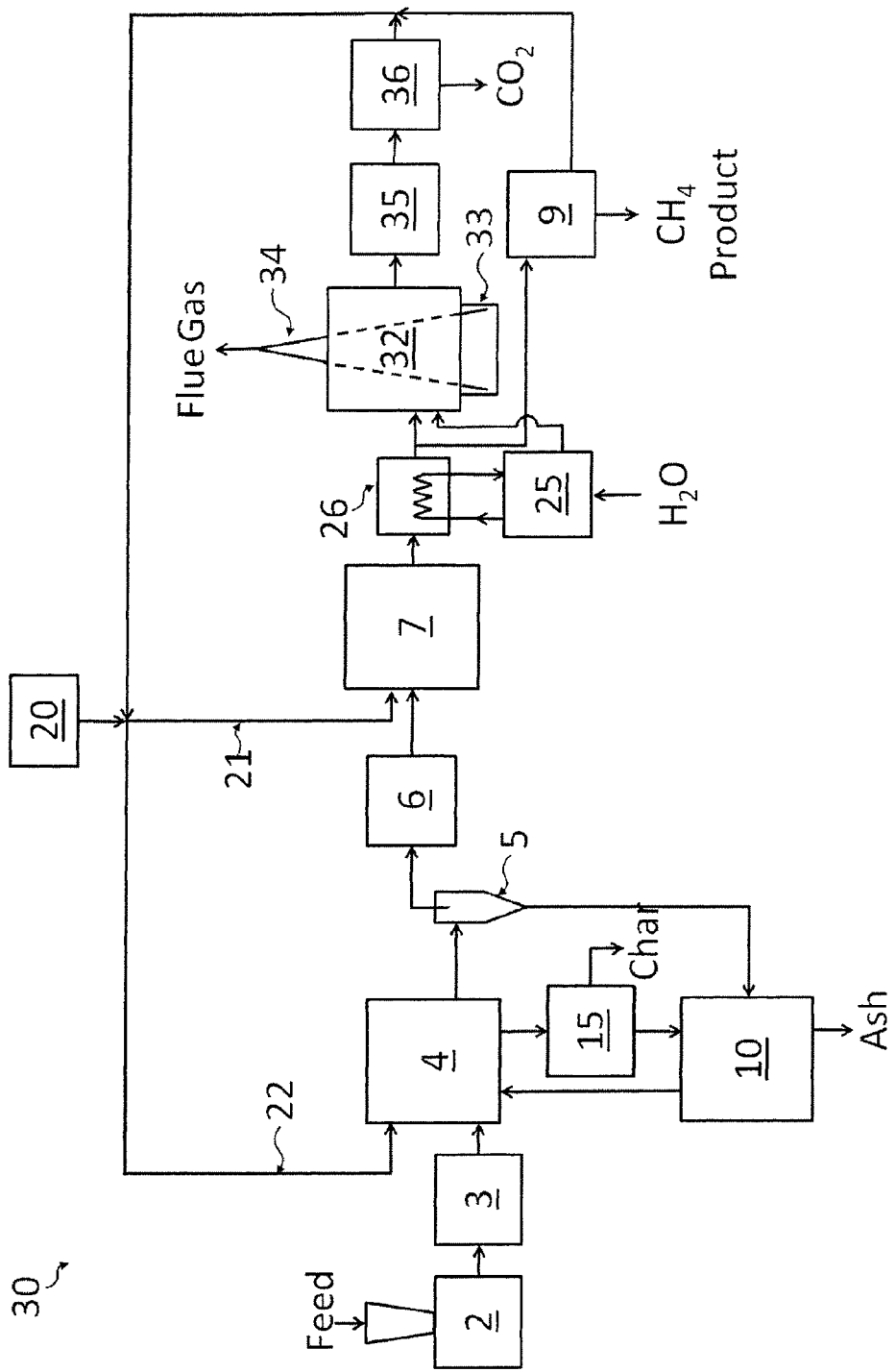
FIG. 2 shows an embodiment with steam reforming of a portion of the initial methane product to generate hydrogen for the hydrogasification reaction.

As also shown in FIG. 2, a portion of the char exiting reactor 4 may be separated from the heat exchange media by char separator 15 as the feedstock for an auxiliary oxygen or steam gasification method to generate syngas, and after water gas shift and $CO_2$ removal from the syngas, supplemental hydrogen for the subsequent hydrogasification reaction.

Alternatively a portion of the char exiting reactor 4 may be separated by char separator 15 and diverted to other external uses, including sale of charcoal as a solid fuel, or as a "biochar" soil amendment for agriculture or forestry uses with an important purpose of carbon sequestration in the soil. Ash may also be a useful byproduct for soil enhancement and recycle of nutrients for overall sustainability of biomass cultivation, harvesting and utilization.

Solids are removed from the effluent pyrolysis gas exiting pyrolysis reactor 4 by a solids removal section 5 including one or multiple cyclones, and optionally also high temperature filters such as metallic or ceramic candle filters. A catalyst poison removal section 6 (including a desulfurization reactor using zinc oxide for $H_2S$ removal, and optionally including other sorbent beds for removal of chlorides and/or alkalis) may be included here for protection of downstream catalysts.

The pyrolysis gas is introduced to catalytic hydrogasification reactor 7, together with hydrogen (or hydrogen-rich gas) and optionally also with supplemental steam in the feed to reactor 7. Hydrogen reactively deoxygenates the pyrolysis gas components to generate methane and other light hydrocarbons. Hydrogen and steam act to crack larger molecules, and to inhibit coking. If the pressurized hydrogasification reaction is operated with a large excess of hydrogen, the reactor effluent will contain $CH_4$ and $H_2O$ with minimal concentrations of CO and $CO_2$.

If the pressurized hydrogasification reaction is operated with relatively less hydrogen and relatively more steam, method conditions can be selected according to the method of the present invention so that the reactor effluent will contain roughly equal amounts of $CH_4$ and $CO_2$ with a much lower and less costly requirement for $H_2$ supply to reactor 7. In this operating mode, the hydrogasification method is self-sufficient for its own hydrogen needs.

The hydrogen supply for hydrogasification will be obtained in part by recycle from downstream gas separation units, particularly from the separation of methane and hydrogen in methane upgrading section 9. Hydrogen may also be provided by steam reforming a portion (up to approximately half) of the produced methane, as shown in the embodiment of FIG. 2.

The hydrogen supply to hydrogasification reactor 7 may be introduced directly to that reactor by conduit 21, or may be introduced upstream to pyrolysis reactor 4 by conduit 22, or may be introduced in divided streams to both reactors 4 and 7. While it is necessary that the recycle stream be processed to remove at least a portion of $CO_2$ so that the recycle stream is enriched in hydrogen and at least partially deoxygenated, it is not necessary that the entire recycle be purified hydrogen. Hence, a recycle stream may also be provided from the $CO_2$ removal step in carbon dioxide removal section 8, with delivery to hydrogasification reactor 7 or to reactor 4 as shown by optional conduits 23 and 24 shown as dashed lines in FIG. 1.

Supplemental hydrogen may alternatively be supplied to reactor 4 and/or reactor 7 from an external source 20, for example from hydrogen-rich offgas from ethylene production, methanol synthesis, or chlor-alkali plants. External source 20 could also be an electrolytic hydrogen generator, powered by a renewable energy source such as wind turbine or solar photovoltaic power plants.

Steam is optionally provided to hydrogasification reactor 7 from a steam generator 25 with heat exchange from product gas clean-up scrubbers 26 and 27 respectively upstream and downstream of carbon dioxide removal section 8. Steam generator 25 may also be heated with excess heat from combustion of char in media heater 10, and with water preheat from heat exchange to capture waste heat from gas and materials streams exiting the method. Feed water for steam generator 25 may be recovered from the raw product gas in carbon dioxide removal section 8 or product gas clean-up scrubber 27. A portion of method water demand will also be provided by residual humidity of the feed biomass.

In some embodiments, the carbon dioxide removal section 8 is operated at near ambient temperature, and uses a physical solvent such as liquid water to remove $CO_2$ from the product gas stream. Product methane upgrading section 9 may use pressure swing adsorption or a multistage membrane gas separation system to achieve desired final product methane purity, with hydrogen and other gas components recycled to the hydrogasification method.

In an important aspect of the present invention as mentioned above, self-sufficiency in hydrogen generation can be achieved by a hydrogasification reactor which is co-fed with steam. It has been discovered in the present invention that self-sufficient hydrogen generation in steam hydrogasification (without hydrogen supply from an external source or from steam reforming a portion of the produced methane as illustrated in the embodiment of FIG. 2) can be achieved in a substantially non-coking regime subject to the following general correlation between operating pressure "P" (bara) and temperature "T"(° C.) in the hydrogasification reactor:

$$\log_{10}(P)=A(T-T_o) \quad \text{(equation \#1)}$$

where the empirical parameter "A" is in the approximate range $$0.05<A<0.10,$$

and preferably A=0.06 approximately; while "$T_o$" is in the approximate range $$400°<T_o<600°,$$

and preferably $T_o$=540° approximately for the example of an equimolar feed of 1.5 molecules $H_2$ and 1.5 molecules $H_2O$ per atom of carbon in the feed woody biomass and including water contained in that biomass after the feed preparation step.

Lower $T_o$ in equation #1 corresponds to relatively less hydrogen and relatively more steam in the feed to the hydrogasification reactor, and increases the recommended P for given T. Higher $T_o$ corresponds to relatively more hydrogen and relatively less steam in the feed to the hydrogasification reactor, and reduces the recommended P for given T, while also making the separation of recycle hydrogen from the product methane more difficult not only because of lower total pressure but also because of a lower ratio of methane to hydrogen in the feed to the methane upgrading section 9.

Equation #1 is applicable to steam hydrogasification of woody biomass under the range of operating temperatures from 400° C. to 1000° C., and operating total pressures from 1 bara to 100 bara. Catalysts may not be required for hydrogasification temperatures above 800° C., but are required for the lower temperatures.

It was assumed in the derivation of equation #1 that about 21% of the feed biomass carbon is rejected as char in the pyrolysis step, that no supplemental source of hydrogen is provided to the hydrogasification reactor except that generated within that reactor and recycled from the methane upgrading section downstream, and that the purified product methane will contain not more than about 1% hydrogen.

FIG. 2 shows an embodiment 30 in which the hydrogasification reactor 7 is operated with excess hydrogen gas (e.g. up to about 3 or more molecules of hydrogen per atom of carbon in the feed woody biomass or other feedstocks, to avoid coking and to drive the methanation reaction) so that nearly all of the carbon in the feed pyrolysis gas is converted into methane, and up to approximately half of that methane is subsequently used to generate the make-up hydrogen by conventional steam methane reforming.

Methane-rich product gas from hydrogasification reactor 7 is cooled by quenching in product gas clean-up scrubber 26 which may use a paraffinic oil as solvent to remove tar constituents. At least about half of the cleaned product gas is admitted to the methane upgrading section 9 which includes a gas separation system for separating hydrogen and other gas components from the product methane. The remainder of the cleaned product gas is introduced with steam from steam generator 25 as feed gas to a catalytic steam reformer 32. The water feed to steam generator 25 may be recovered from condensate from product gas clean-up section 27 as shown in FIG. 1.

Steam reformer 32 typically reacts its feed gas with steam over a nickel catalyst operating at about 850° C. in high alloy tubes within a furnace 33, which is fueled by combustion of any convenient fuel such as a portion of the pyrolysis gas or char from pyrolysis reactor 4. After heat recovery from the combustion flue gas from furnace 33 to the steam reformer and for steam generation, the flue gas is vented from stack 34. Syngas generated by the steam reformer 32 is passed for hydrogen enrichment by conversion of CO through a water gas shift reactor 35 with further heat recovery for steam generation, for preheating reactants entering reformer 32 or pyrolysis reactor 4, or for drying biomass in the feed preparation section 2. The hydrogen enriched syngas is then passed through a carbon dioxide removal section 36, and is then recycled by conduit 21 to hydrogasification reactor 7 and/or pyrolysis reactor 4.

Figure 3:
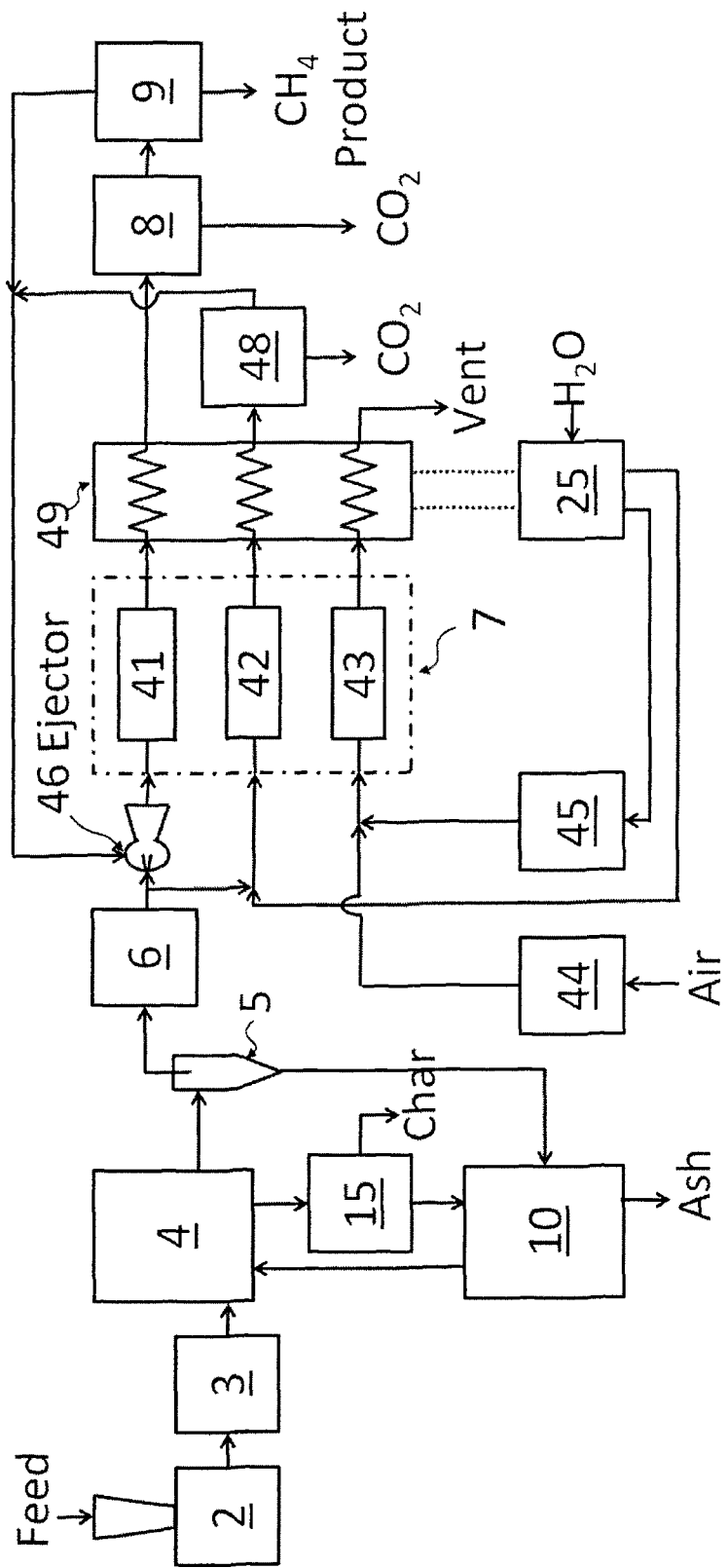
FIG. 3 shows an embodiment in which the hydrogasification reactor includes zones for methanation, steam reforming and catalyst regeneration.

FIG. 3 shows an embodiment 40 in which the hydrogasification reactor 7 includes a methanation zone 41, a steam reforming zone 42 and a catalyst regeneration zone 43. Pyrolysis gas is introduced as feed to both the methanation zone 41 and the steam reforming zone 42.

The feed to the methanation zone 41 includes pyrolysis gas, plus hydrogen-rich gas generated by the steam reforming zone after $CO_2$ removal (optionally preceded by water gas shift reaction), and hydrogen-rich gas recycled from the methane upgrading section 9. The feed to the steam reforming zone 42 includes pyrolysis gas plus steam from the steam generator 25.

The feed to the catalyst regeneration zone 43 may be steam plus a small amount of air or oxygen from an optional auxiliary oxygen concentrator 44, or steam from steam generator 25 which has been superheated by a superheater 45. After heat recovery from the high temperature gas exiting catalyst regeneration zone 43, that gas may be vented if its fuel value has been consumed by oxidation, or alternatively blended with the product gas from steam reforming zone 42 in order to recover syngas generated by gasification of coke deposits during catalyst regeneration by superheated steam.

An ejector 46 is provided to energize and mix flow of the hydrogen-rich gas generated by the steam reforming zone 42 into the feed to the methanation zone 41.

In addition to the $CO_2$ removal unit 8 downstream of the methanator zone 41, another $CO_2$ removal unit 48 is provided downstream of steam reforming zone 42. The $CO_2$ removal units 8 and 48 may desirably include water gas shift reactor functionality. According to whether the $CO_2$ removal steps are conducted at elevated or near-ambient temperature, a heat recovery unit 49 will be installed respectively either downstream of $CO_2$ removal unit 8 or upstream of both $CO_2$ removal units 8 and 48 as shown in FIG. 3, with heat from heat recovery unit 49 delivered to steam generator 25.

A preferred technique for water gas shift reaction directly integrated with elevated temperature $CO_2$ removal is sorption enhanced reaction using alkali-promoted hydrotalcite adsorbents which are effective for $CO_2$ separation in the temperature range of about 400° C. to about 500° C. Regeneration may be achieved by thermal swing or pressure swing.

It is contemplated that the catalyst will be cyclically switched between the exothermic and desirably lower temperature methanation step in zone 41, the endothermic and desirably higher temperature reforming step in zone 42, and the highest temperature heating step in regeneration zone 43. The catalyst would move in sequence from maximum temperature zone 43 to be cooled in zone 42, and then mildly reheated in zone 41.

Higher temperature, high steam concentration and low hydrogen concentration drive the reforming reaction forward. Lower temperature, low steam concentration and high hydrogen concentration drive the methanation reaction forward.

Reforming and methanation reactions may take place in each of zones 41 and 42, with the equilibrium balance driven not only by bed temperature but also by the steam/hydrogen ratio so that the methanation reaction predominates in zone 41 to achieve the methanation step of the method while the reforming reaction predominates in zone 42 to achieve the reforming step of the method. The respective zones of the hydrogasification reactor 7 are cooled in the reforming step, heated in the methanation step, and strongly heated to the maximum method temperature in the regeneration step of the method. The reforming step starts immediately after the regeneration step to take advantage of sensible heat in the catalyst, then the methanation step is conducted after the reforming step has cooled the catalyst, and then the next regeneration step is performed to finish reheating the catalyst.

This switching logic could be achieved by moving granular catalyst beds in fixed vessels, by circulating fluidized beds in fixed vessels, or in preferred embodiments by rotary monolith beds. Sorption enhanced water gas shift reactors may also be realized in rotary monolith architectures providing the valve switching function required for implementation of pressure or thermal swing adsorption cycles.

Figure 4:
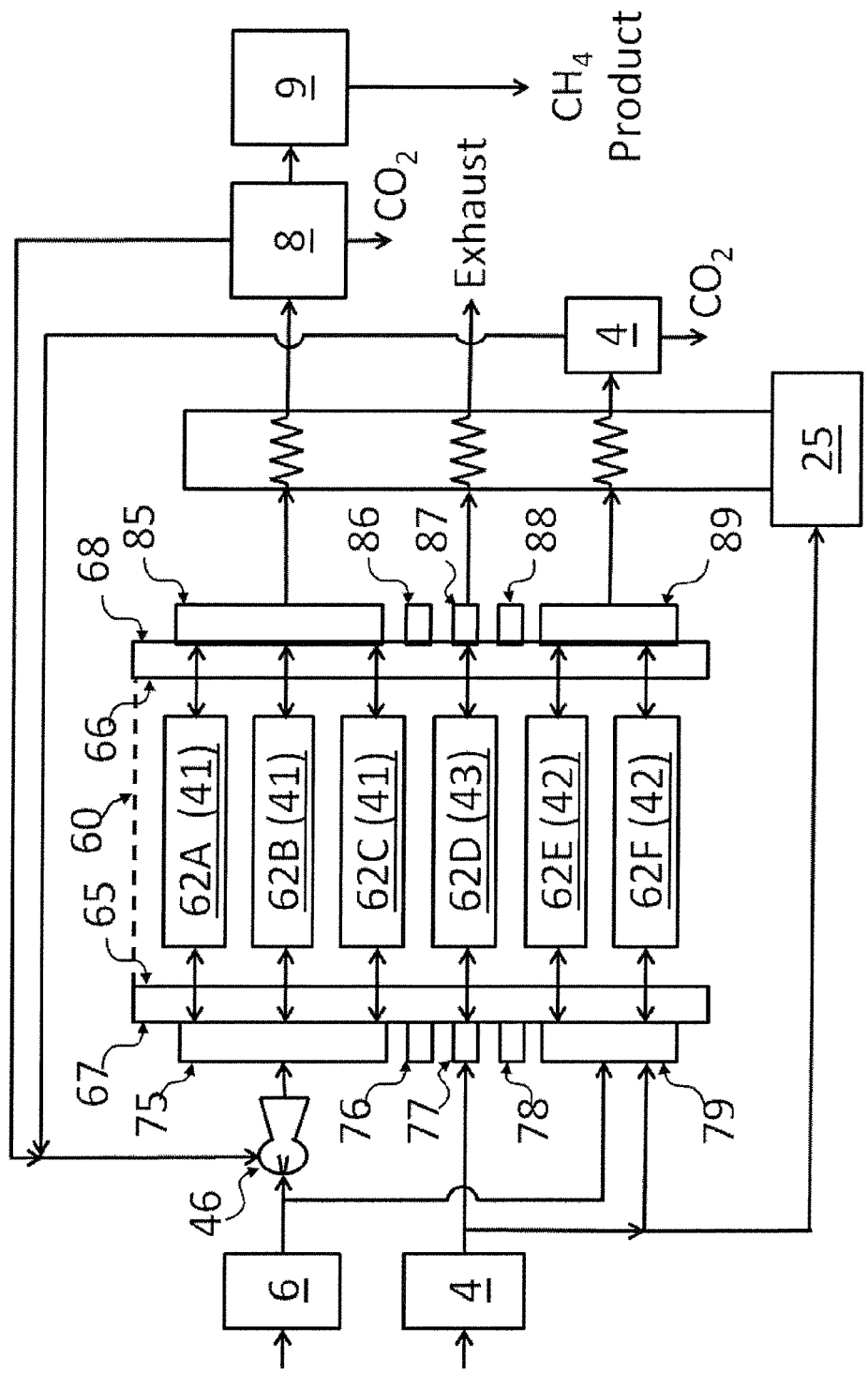
FIGS. 4 and 5 show a rotary embodiment of the catalytic hydrogasification reactor.
Figure 5:
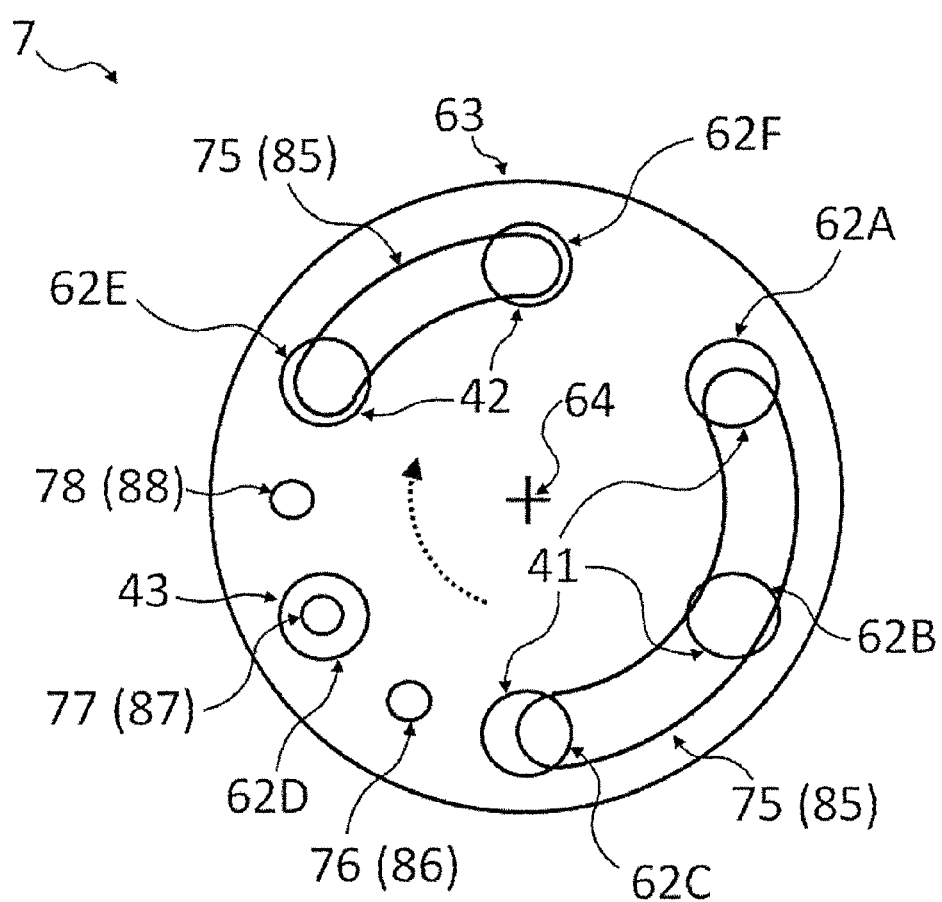

FIGS. 4 and 5 show a rotary embodiment of the catalytic hydrogasification reactor 7. Catalyst (and/or a high temperature adsorbent such as potassium or cesium promoted hydrotalcite) is supported on a high surface area parallel passage structure such as a ceramic or metallic honeycomb monolith, laminated support sheets separated by spacers, or a spiral roll-up laminate structure in each of a plurality of fixed beds mounted in a rotor 60. Spiral roll structures may formed by winding flat sheets with spacers or a self-supporting mesh or fabric around a central mandrel. Other suitable support structures may use expanded metal, wire mesh or solidified foams with interconnecting cavities to form flow channels.

A plurality of fixed beds 62A-62F are mounted in rotor 60 rotating about rotary axis 64 between a first rotary valve face 65 and a second rotary valve face 66. In this example, three beds 62A, 62B and 62C are in the methanation zone 41, one bed 62D is in the regeneration zone 43, and two beds 62E and 62F are in the reforming zone 42. Reference numerals for zones 41-43 are shown in brackets after the reference numerals for beds 62A-62F. The number of beds in each zone may be adjusted according to the time required to conduct each step with desirable gas flow rates and temperature adjustment rates.

First rotary valve face 65 engages sealingly with a first valve stator 67, and second rotary valve face 66 engages sealingly with a second valve stator 68. Fluid connection ports 75, 76, 77, 78 and 79 are provided in first valve stator face 67, while fluid connection ports 85, 86, 87, 88 and 89 are provided in second valve stator face 68. FIG. 5 shows the ports for the first valve stator 67 face, with bracketed reference numerals for the corresponding ports of the second valve stator 68 face.

The pyrolysis gas is admitted with hydrogen-rich syngas from reforming zone 42 and hydrogen-rich recycle gas from methane upgrading section 9 to port 75 communicating to the hydrogasification zone 41 in rotor 60. Raw product methane gas is delivered from port 85 to heat recovery, clean-up and purification steps.

Regeneration gas is introduced to port 77 communicating to the regeneration zone 43 in rotor 60, while the $CO_2$ containing exhaust is discharged from port 87 to heat recovery and subsequent venting. The regeneration gas may comprise preheated regeneration air, enriched oxygen, steam containing some enriched oxygen, or superheated steam. Cocurrent regeneration as shown in FIG. 3 may be replaced with countercurrent regeneration by introducing the preheated regeneration air to port 87, and discharging the exhaust from port 77.

Pyrolysis gas together with steam is admitted to port 79 communicating to the reforming zone 42 in rotor 60 while the resulting syngas is delivered from port 89 for heat recovery, $CO_2$ removal and delivery to port 75.

Intermediate ports 76 and 78 in the first stator, and intermediate ports 86 and 88 in the second stator, are optionally provided to enable buffer purge steps with steam or other inert gas between the regeneration step and respectively hydrogasification or methanation steps, so as to avoid hazardous direct contact of undiluted air with high concentration fuel gas. The intermediate ports may also be used for pressure equalization steps between the hydrogasification and reforming steps performed at elevated pressure, and the regeneration step if regeneration is performed at lower pressure or substantially atmospheric pressure. Pressure equalization steps would also be useful if beds 62 contain an adsorbent such as hydrotalcite, so that a pressure swing adsorption cycle is performed to remove $CO_2$ at elevated temperature while shifting the water gas shift reaction for high conversion of CO and steam into $H_2$ and $CO_2$.

A membrane gas separation system may be advantageously used for purification of product methane and separation of hydrogen-rich gas for recycle to hydrogasification. The polymeric membrane will selectively permeate hydrogen, carbon monoxide, carbon dioxide and water vapour relative to methane. In order to obtain product methane containing no more than 1% hydrogen, three membrane stages may be used in series to progressively concentrate methane with high recovery and purity in the retentate stream. The feed gas is introduced to the inlet of the first stage, from which the hydrogen-enriched recycle gas will be delivered as low pressure permeate. The permeate of the second stage will be recompressed to join the feed at the inlet of the first stage, while the permeate of the third stage will be recompressed to the inlet of the second stage.

Alternatively, a pressure swing adsorption gas separation system may be used for purification of product methane and separation of hydrogen-rich gas for recycle to hydrogasification.

INDUSTRIAL APPLICABILITY

Disclosed embodiments of the method and system are useful for high efficiency conversion of biomass including forestry residues and sawmill waste into SNG, either as a fuel commodity or for high efficiency generation of electrical power. Forestry residues may be generated by logging, thinning, and wildfire prevention fuel load reduction activities.

The inventive system may be used at industrial scale limited only by transportation distances for collection of biomass feedstock, or at smaller scale in rural or remote areas for combined generation of heat, high heating value fuel gas and electricity. At the smallest scale, the system may be used for residential heating, methane fuel production and electrical power generation through a solid oxide fuel cell or other energy converter consuming a portion of the product methane.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for converting a biomass feedstock into a product hydrocarbon, comprising:
    subjecting feedstock to fast pyrolysis in substantial absence of oxygen in order to generate fractions of pyrolysis gas and char;
    converting at least a portion of the pyrolysis gas to product hydrocarbon and carbon dioxide over a catalyst in the presence of hydrogen and steam;
    generating at least a portion of the hydrogen by reaction between steam and a portion of the pyrolysis gas or the hydrocarbon product over the catalyst;
    separating carbon dioxide;
    separating recycle hydrogen from the hydrocarbon product; and
    regenerating the catalyst used to produce the hydrogen and the hydrocarbon.

2. The method of claim 1, where generating at least a portion of the hydrogen comprises generating substantially all of the hydrogen used to produce hydrocarbon and carbon dioxide by the reaction between steam and a portion of the pyrolysis gas.

3. The method of claim 2, further comprising generating at least a portion of the hydrogen at a reaction temperature T (° C.), and at a reaction total pressure P (bara) correlated with the reaction temperature T by the relation $$\log_{10} P = A(T-T_o)$$

where $T_o$ is in the approximate range of 400° C.$<T_o<$600° C., and empirical parameter A is in the approximate range of 0.05$<$A$<$0.10.

4. The method of claim 3 where A is about 0.06 and $T_o$ is about 540° C.

5. The method of claim 1, in which the product hydrocarbon is mainly methane and converting at least a portion of the pyrolysis gas to product hydrocarbon and carbon dioxide comprises a methanation step performed over a catalyst.

6. The method of claim 5, where generating at least a portion of the hydrogen comprises a steam reforming step performed over the same catalyst as in the methanation step.

7. The method of claim 1, wherein regenerating the catalyst comprises removing coke.

8. The method of claim 1, where regenerating the catalyst comprises contacting the catalyst with steam or superheated steam.

9. The method of claim 1, where regenerating the catalyst comprises an oxidative regeneration step performed by contacting the catalyst with steam and air or enriched oxygen.

10. The method of claim 1, further comprising providing the catalyst in any of the following reactor configurations so that the catalyst will cycle between reaction zones for steam reforming, methanation and regeneration steps:
    moving bed with granular catalyst;
    fixed bed with granular packing or monolithic catalyst, and rotary or directional valve logic for cyclically switching beds between reaction and regeneration steps; or
    bubbling or circulating fluidized bed.

11. The method of claim 1, wherein:
    generating at least a portion of the hydrogen comprises an endothermic steam reforming step starting from a higher temperature and ending at a lower temperature;
    converting at least a portion of the pyrolysis gas to product hydrocarbon and carbon dioxide comprises an exothermic methanation step starting from the lower temperature; and
    regenerating the catalyst comprises an oxidative regeneration step ending at the higher temperature.

12. The method of claim 11, in which the higher temperature is from about 600° C. to about 900° C.

13. The method of claim 11, in which the lower temperature is from about 400° C. to about 600° C.

14. A system for producing hydrocarbons from biomass, comprising:
    fast pyrolysis means operating at a process temperature less than about 650° C. for producing pyrolysis gas and char;
    independent catalytic conversion means downstream of the fast pyrolysis means operating at a process temperature less than about 650° C. for converting the pyrolysis gas to hydrocarbons over a catalyst;
    a hydrogen source for adding hydrogen to the independent catalytic conversion means;
    a steam reforming zone comprising the catalyst for producing at least a portion of the hydrogen used to convert the pyrolysis gas to hydrocarbons; and
    a regeneration zone for heating and regenerating the catalyst used in the independent catalytic conversion means and the steam reformation zone.

15. The system according to claim 14 where the fast pyrolysis means includes a hydrogen sweep gas.

16. The system according to claim 14 where the hydrocarbons converted over the catalyst are mainly methane, and the catalyst is in a methanation zone.

17. The system according to claim 14, with means for cyclically circulating or switching the catalyst between the steam reforming, methanation and regeneration zones.

18. The system according to claim 17, in which the catalyst is supported in fixed beds with switching valves to establish the steam reforming, methanation and regeneration zones to which each bed is cycled.

19. The system according to claim 17, in which fixed beds containing the catalyst are mounted in a rotor with rotary valve ports sealingly engaged with fixed ports to establish the steam reforming, methanation and regeneration zones to which each bed is cycled.

20. The system according to claim 17 where substantially all of the hydrogen is produced in the steam reforming zone.

21. A system for producing hydrocarbons from biomass, comprising:
    a fast pyrolysis reactor operating at a process temperature less than about 650° C. for producing pyrolysis gas and char;
    a methanation zone downstream of the fast pyrolysis means operating at a process temperature less than about 650° C. for converting the pyrolysis gas to hydrocarbons over a catalyst;
    a hydrogen source for adding hydrogen to the independent catalytic conversion means;
    a steam reforming zone comprising the catalyst for producing at least a portion of the hydrogen used to convert the pyrolysis gas to hydrocarbons; and
    a regeneration zone for heating and regenerating the catalyst used in the independent catalytic conversion means and the steam reformation zone.

22. The system according to claim 21, further comprising a circulator or switching valves to cyclically circulate or switch the catalyst between the steam reforming, methanation and regeneration zones.

23. The system according to claim 22, in which the catalyst is supported in fixed beds with switching valves to establish the steam reforming, methanation and regeneration zones to which each bed is cycled.

24. The system according to claim 22, in which fixed beds containing the catalyst are mounted in a rotor with rotary valve ports sealingly engaged with fixed ports to establish the steam reforming, methanation and regeneration zones to which each bed is cycled.

* * * * *